United States Patent
Kirchoff et al.

(10) Patent No.: US 6,582,016 B1
(45) Date of Patent: Jun. 24, 2003

(54) SEAT TRIM CLOSEOUT FOR ISOFIX SYSTEMS

(75) Inventors: Douglas J. Kirchoff, Waterford, MI (US); Jerry D. Crummel, Luna Pier, MI (US); Linda M. Magier, Allen Park, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/919,332

(22) Filed: Jul. 31, 2001

(51) Int. Cl.$^7$ .................................................. B60N 2/28
(52) U.S. Cl. ..................... 297/253; 297/256.1; 297/464
(58) Field of Search ............................... 297/250.1, 253, 297/463.1, 463.2, 464

(56) References Cited

U.S. PATENT DOCUMENTS

| | | | |
|---|---|---|---|
| 2,813,726 A | | 11/1957 | Leonard |
| 2,848,250 A | | 8/1958 | Sheren |
| 2,855,215 A | | 10/1958 | Sheren |
| 3,615,118 A | * | 10/1971 | Buxton .................. 297/188.07 |
| 3,664,140 A | | 5/1972 | Shimizu |
| 3,712,401 A | | 1/1973 | Rothschild |
| 3,954,280 A | | 5/1976 | Roberts et al. |
| 3,994,513 A | | 11/1976 | Courtis et al. |
| 4,133,556 A | | 1/1979 | Glinski |
| 4,218,074 A | | 8/1980 | Crawford |
| 4,611,854 A | | 9/1986 | Pfeiffer |
| 4,634,184 A | | 1/1987 | Hitson |
| 4,637,650 A | * | 1/1987 | Inoue ......................... 297/410 |
| 4,767,161 A | | 8/1988 | Sedlmayr et al. |
| 4,810,037 A | * | 3/1989 | Takagi ........................ 297/481 |
| 4,915,451 A | | 4/1990 | Forget et al. |
| 4,928,992 A | | 5/1990 | Qvint et al. |
| 4,986,603 A | | 1/1991 | Hanai et al. |
| 4,995,672 A | | 2/1991 | Corcoran |
| 5,039,166 A | * | 8/1991 | Kojho ...................... 297/344.1 |
| 5,242,143 A | * | 9/1993 | Nagashima et al. ..... 248/345.1 |
| 5,263,763 A | | 11/1993 | Billette |
| 5,332,261 A | | 7/1994 | Siepierski |
| 5,383,708 A | | 1/1995 | Nagasaka et al. |
| 5,466,044 A | | 11/1995 | Barley et al. |
| 5,468,014 A | | 11/1995 | Gimbel et al. |
| 5,487,588 A | | 1/1996 | Burleigh et al. |

(List continued on next page.)

FOREIGN PATENT DOCUMENTS

| | | | |
|---|---|---|---|
| DE | 3107752 | | 9/1982 |
| DE | 29604073 | | 6/1996 |
| EP | 0164909 | | 12/1985 |
| EP | 0552570 | | 7/1993 |
| EP | 0619202 | | 10/1994 |
| EP | 0694436 | | 1/1996 |
| EP | 0703113 | | 3/1996 |
| FR | 2408360 A | * | 7/1979 |
| FR | 2635836 | | 3/1990 |
| GB | 1416441 | | 12/1975 |
| GB | 1595954 | | 8/1981 |
| GB | 2137084 | | 10/1984 |
| GB | 2254548 | | 10/1992 |
| GB | 2260695 | | 4/1993 |
| GB | 2277018 | | 10/1994 |
| GB | 2297479 | | 8/1996 |
| GB | 2302274 | | 1/1997 |
| JP | 2001354058 A | * | 12/2001 |
| WO | 9838061 | | 9/1998 |

*Primary Examiner*—Peter M. Cuomo
*Assistant Examiner*—Joseph Edell
(74) *Attorney, Agent, or Firm*—Foley & Lardner

(57) ABSTRACT

A cavity and channel system within a seat back is adapted to provide design flexibility in locating isofix attachment rods. The system includes a rear cavity for receiving the isofix rod and a channel which extends through the seat back. A plate is designed to substantially close the rear of the cavity to prevent wind and noise issues, and a tunnel is attached to the front of the plate to provide the appearance of a smooth seam when a child seat is not in use.

17 Claims, 4 Drawing Sheets

U.S. PATENT DOCUMENTS

| | | |
|---|---|---|
| 5,536,066 A | 7/1996 | Sedlack |
| 5,609,367 A | 3/1997 | Eusebi et al. |
| 5,620,225 A | 4/1997 | Harry |
| 5,628,543 A * | 5/1997 | Filipovich et al. .......... 297/113 |
| 5,641,254 A | 6/1997 | Sullivan |
| 5,669,663 A | 9/1997 | Feuerherdt |
| 5,700,058 A | 12/1997 | Balagurumurthy et al. |
| 5,833,203 A | 11/1998 | Denis et al. |
| 5,845,966 A * | 12/1998 | Severinski et al. .... 297/216.13 |
| 5,855,047 A | 1/1999 | Haas |
| 5,918,934 A | 7/1999 | Siegrist |
| 5,975,611 A | 11/1999 | Hoshihara et al. |
| 6,030,044 A | 2/2000 | Kosugi et al. |
| 6,030,046 A | 2/2000 | Dorow |
| 6,033,029 A | 3/2000 | Henshall |
| 6,196,628 B1 * | 3/2001 | Goy et al. .................. 297/253 |
| 6,234,572 B1 * | 5/2001 | Shiino et al. ................ 297/253 |
| 6,478,376 B2 * | 11/2002 | Hayashi et al. .......... 297/250.1 |
| 6,485,055 B1 * | 11/2002 | Swayne et al. .......... 280/801.1 |

* cited by examiner

SEAT TRIM CLOSEOUT FOR ISOFIX SYSTEMS

BACKGROUND OF THE INVENTION

1. Field of the Invention

The present invention relates generally to vehicle seating and more particularly to vehicle seats which include anchorage rods for infant and toddler car seat attachment hooks. Still more specifically, the present invention relates to a trim closeout system which allows the rods to be located at locations along a seat which otherwise would interfere with seat aesthetics and design.

2. Description of the Prior Art

The use of wire rods at specified locations in vehicle seating has been mandated in some countries for several years and is required on vehicles to be produced in the United States in coming years. Standards require that the rods be placed at specific locations and be separated by specific distances. In most cases, the rods extend through the bite line of a vehicle seating set comprised of a seat cushion and a seat back. In other designs, however, it may be desirable to have the rods extend through the seat back, and the design of such systems becomes more complicated from a structural and aesthetic standpoint.

Generally, systems with which the present invention may be used include some type of bar or tube which extends along and beneath the seat and which is anchored to the vehicle or frame. The isofix rods themselves are typically welded to the bar or tube at the desired locations. Alternately, and as illustrated in an application co-pending with this application and assigned to the assignee of the present invention, the isofix rods may be mechanically attached to the bar or tube or to a mounting bracket, and welds are used only to ensure proper location. In the latter design, forces are transferred to the support directly, rather than through welds which may have a greater tendency to fracture or otherwise fail under impact conditions.

A design for an automotive trim system which would conceal isofix rods extending through a seat back and which would overcome the above-noted disadvantages would represent a significant advance in this art.

FEATURES AND SUMMARY OF THE INVENTION

A primary feature of the present invention is to provide a cavity and channel system for isofix rods used for the attachment of child seats.

Another feature of the present invention is to provide a tunnel to create the appearance of a smooth seam when the child seat is not in use.

A different feature of the present invention is to provide a cavity for the isofix rod in a seat back and to eliminate any wind and noise sound.

A still further feature of the present invention is to provide a cavity and channel system which places the channel opening in the correct orientation to permit access to the isofix rod.

Yet a further feature of the present invention is to provide a cavity and channel system for providing access to an isofix rod which is readily adaptable to a wide variety of seat configurations.

Another feature of the present invention is to provide a trim system which is combined with a cavity and channel system to provide an acceptable aesthetic appearance and prevent wind and noise movement through the resultant seat opening.

How these and further features of the present invention are accomplished will be described in the following detailed description of the preferred embodiment, taken in conjunction with the FIGURES. Generally, however, the features are provided by a seat back which includes a first larger cavity on its rear surface and a channel extending from the cavity through the front of the seat back. An isofix rod is adapted to fit within the cavity and crosswise of the channel, so that the rod is accessible for attachment of a child seat. A pair of wires are provided for attachment of a plate to cover the rear cavity opening, which in turn prevents wind and noise problems. In the preferred and illustrated embodiment, trim forms a tunnel, closed on three sides and open at the front and the rear and along the bottom. The rear is attached to the plate, the front opening is attached at a seam or elsewhere on the vehicle interior, and a bottom flap is used to insure that the isofix rod may be easily inserted in the cavity. Other ways in which the features of the present invention are accomplished will become apparent to those skilled in the art after they have had an opportunity to read the present specification, and such other ways are deemed to fall within the scope of the present invention if they fall within the scope of the scope of the claims which follow.

BRIEF DESCRIPTION OF THE DRAWINGS

In the various FIGURES, like reference numerals are used to indicate like components.

DETAILED DESCRIPTION OF THE PREFERRED EMBODIMENTS

Before proceeding to the description of the preferred embodiment of the present invention, several general comments can be made about the applicability and the scope thereof.

First, the size and depth of the cavity and channel described in connection with the illustrated embodiment can be varied depending upon the seat design, the seat structural components and the like. Accordingly, the dimensions should be taken as illustrative rather than limiting.

Second, the plate used to close the rear of the cavity in the illustrated embodiment is attached to a pair of wires located on the rear of the seat or within the seat components. The attachment may be made in a variety of other ways, including adhering the plate to the back of the seat by stitching a fabric plate to the seat, using snaps or other fasteners to attach the plate to the rear of the seat, e.g. zippers, snap fasteners, Velcro® or the like, or using adhesives. Accordingly, the illustrated two-wire attachment system is also provided for purposes of illustration rather than limitation.

Third, the tunnel may be made from a large variety of materials, including the material used for the exterior trim of the seat back which is visible when the child seat is not in use. The material may be selected from those commonly employed in vehicle seats including fabric, vinyl, leather, and combinations of the foregoing. The front of the tunnel may be sewn or otherwise connected to the remainder of the seat interior trim in any desired manner to form an acceptable aesthetic appearance.

Fourth, the particular isofix rod and bar support are illustrative only, and tubes, rods or brackets of other size and shape may be employed. Also, as indicated above, the isofix rod may be mechanically attached to the support, rather than attached primarily by welding. With mechanical attachment, the loads imparted to the rod in an impact situation are transferred directly to the support, rather than to welds.

Fifth, the attachment system may be used with first, second, or third row seating in automobiles, SUVs, minivans and the like, and the rear closure may be selevcted to provide acceptable aesthetics depending on whether passengers are located rearwardly of the back of the seat in which the invention is employed. Hence, the plate may be covered by an exterior trim component, so that it is hidden or is less prominent than would otherwise be the case.

Figure 1:
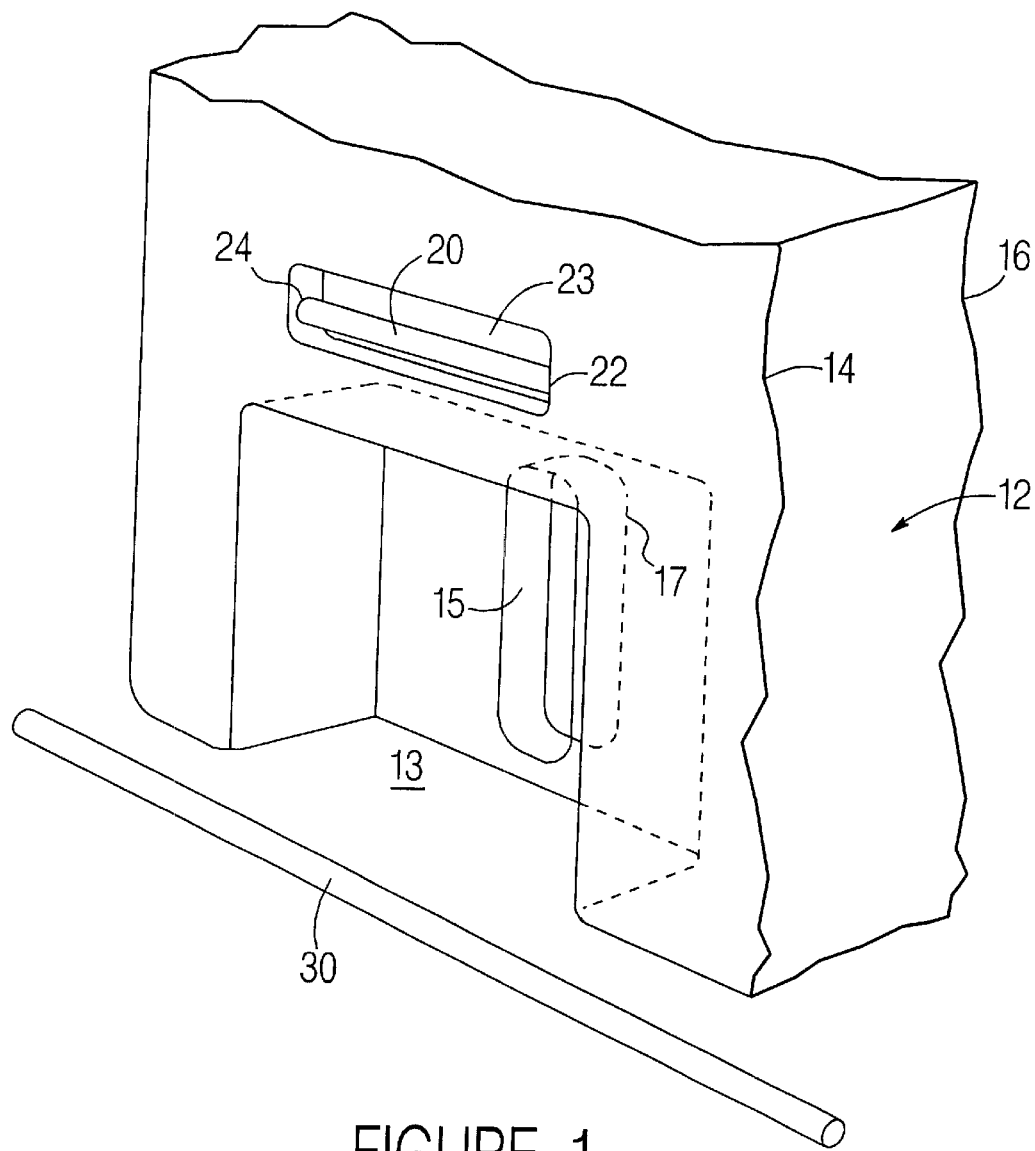
FIG. 1 is a perspective view of the rear of a seat back illustrating the attachment wires, the seat back cavity, and the connection channel.

Proceeding now to a description of the preferred embodiment of the invention, FIG. 1 illustrates a portion of a seat back 12 having a generally square cavity 13 formed in the back 14 thereof. The cavity 13 is open at the bottom and closed on the sides and the top. A generally race track shaped channel 15 extends from the forward most portion of the cavity 13 and is open at the front of the seat back as illustrated by the reference numeral 17.

Two additional components of the preferred embodiment are shown in FIG. 1. The first is a wire 20 which is mounted above cavity 13 and includes first end 21 and second end 22 embedded within a recess 23. Wire 20, as indicated above, can be of any suitable diameter and since the wire will not play a role in the isofix protection system at impact and does not support significant loads, it may be embedded in the normal seat trim components, such as the back support frame or even in foam components. A second wire 30 passes beneath seat back 13, and preferably it is arranged to be parallel to and generally coplanar with wire 20. It may be attached to any suitable structure of the vehicle, the vehicle seat cushion, or the vehicle seat back, depending upon the ultimate design of the seat with which the present invention will be used.

Figure 2:
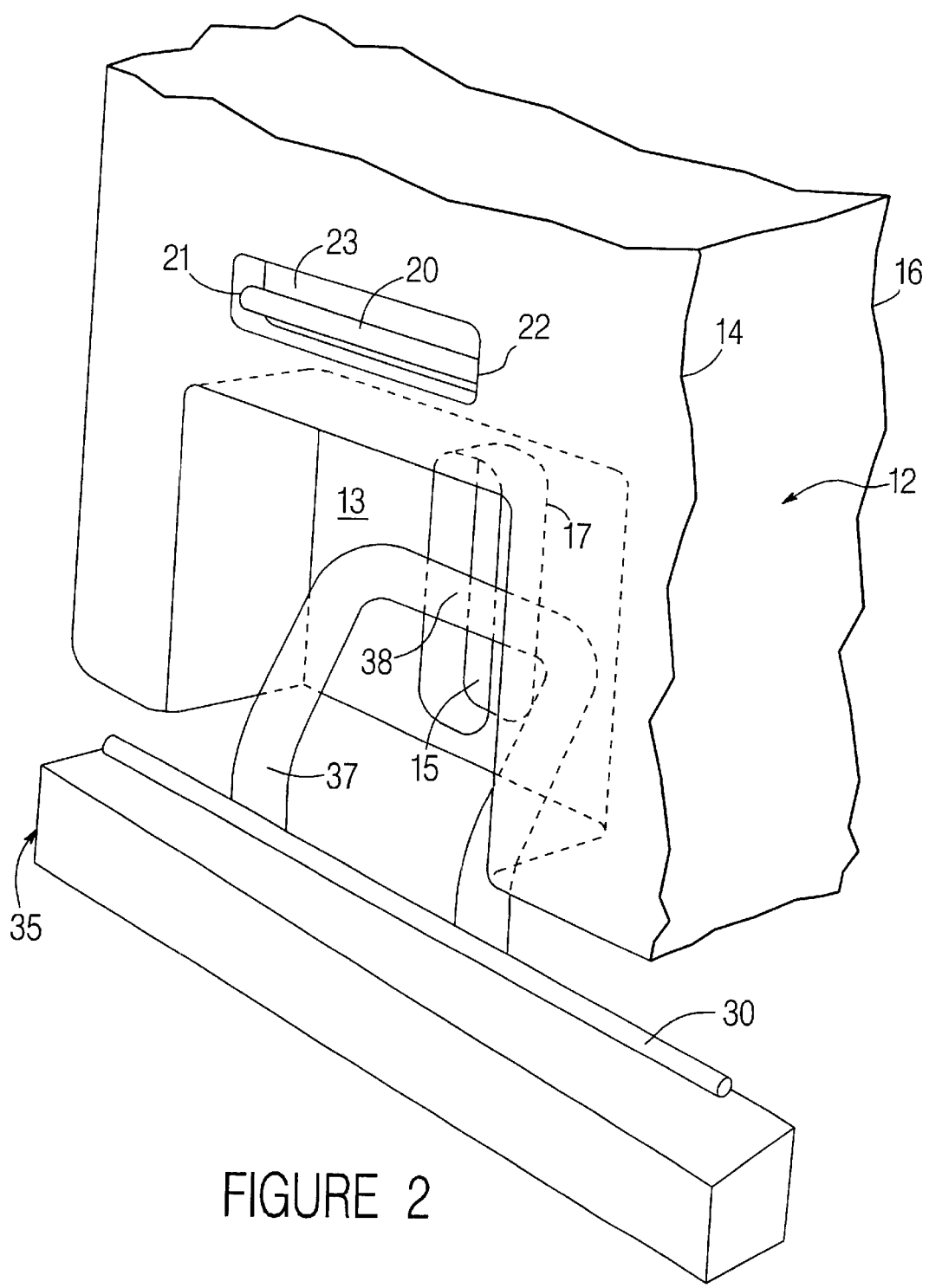
FIG. 2 is a view similar to FIG. 1 and illustrating the isofix rod and a square, tubular support therefor.

Proceeding now to the description of FIG. 2, the isofix components will now be illustrated. They include a support bar 35, which in the illustrated embodiment, is a rectangular bar, and the isofix rod 37 which is secured to bar 35. The isofix rod 37 includes a portion 38 which extends toward the forward portion of cavity 13 and is accessed through cavity 15 from the front 16 of the seat back 12. The particular construction of the isofix bar may be varied in accordance with seat design criteria and regulatory requirements.

Figure 3:
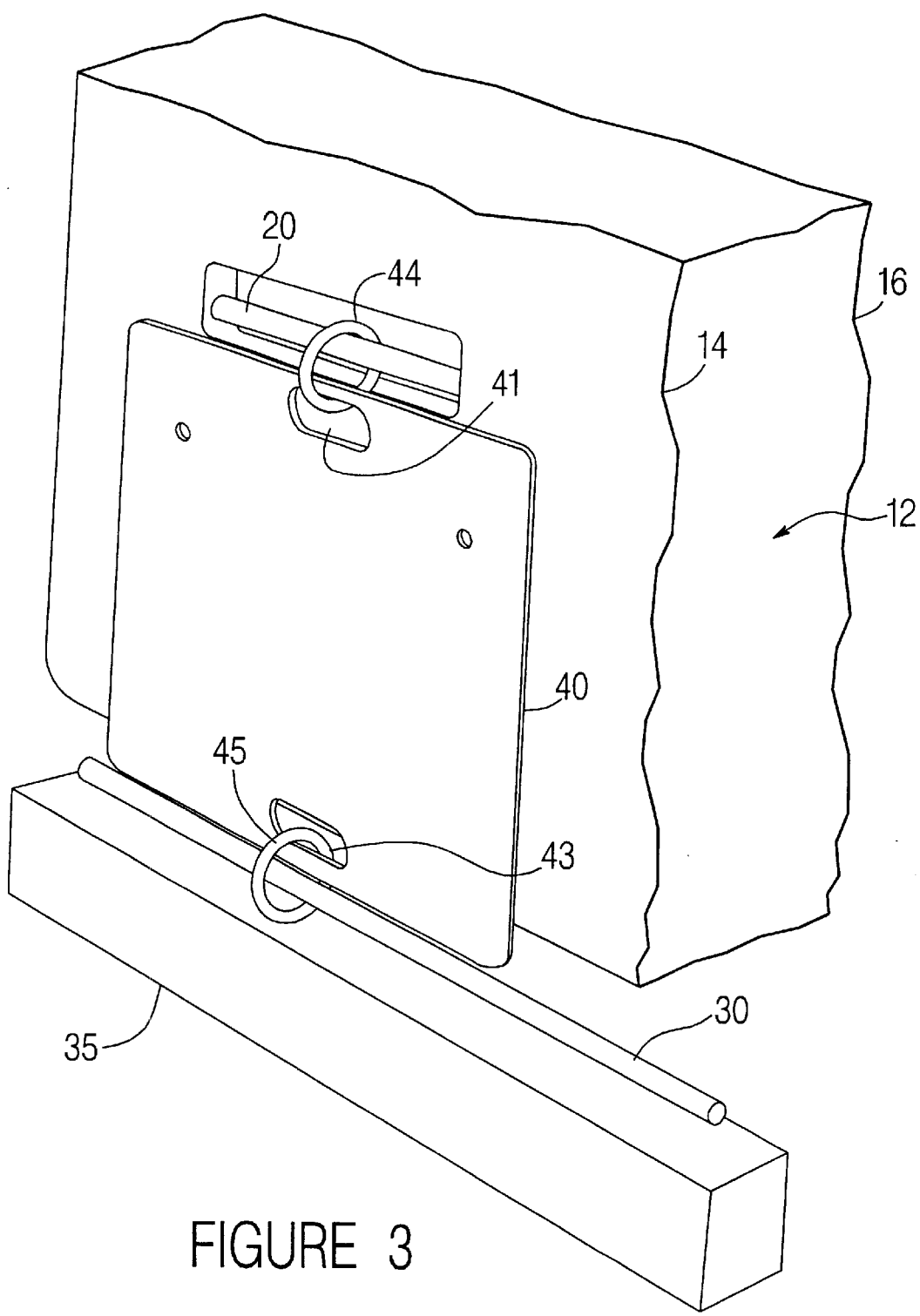
FIG. 3 is a schematic view, similar to FIG. 2, and illustrating a closure plate attached to the attachment wires.

The final components of the isofix portion of the preferred embodiment are illustrated in FIG. 3, namely a closure plate 40 having a pair of openings 41 and 43 located generally adjacent the top and the bottom thereof. A pair of rings 44 and 45 are also shown in this FIGURE. Ring 44 joins opening 41 and wire 20, while ring 45 joins wire 30 and opening 43. It will be appreciated from the description thus far that the plate 40 closes off the rear of cavity 13 and will prevent noise and sound from passing between the area behind seat 12 and that forwardly thereof. The plate 40 will be designed, attached and prepared using materials described in the foregoing portions of this specification.

Figure 4:
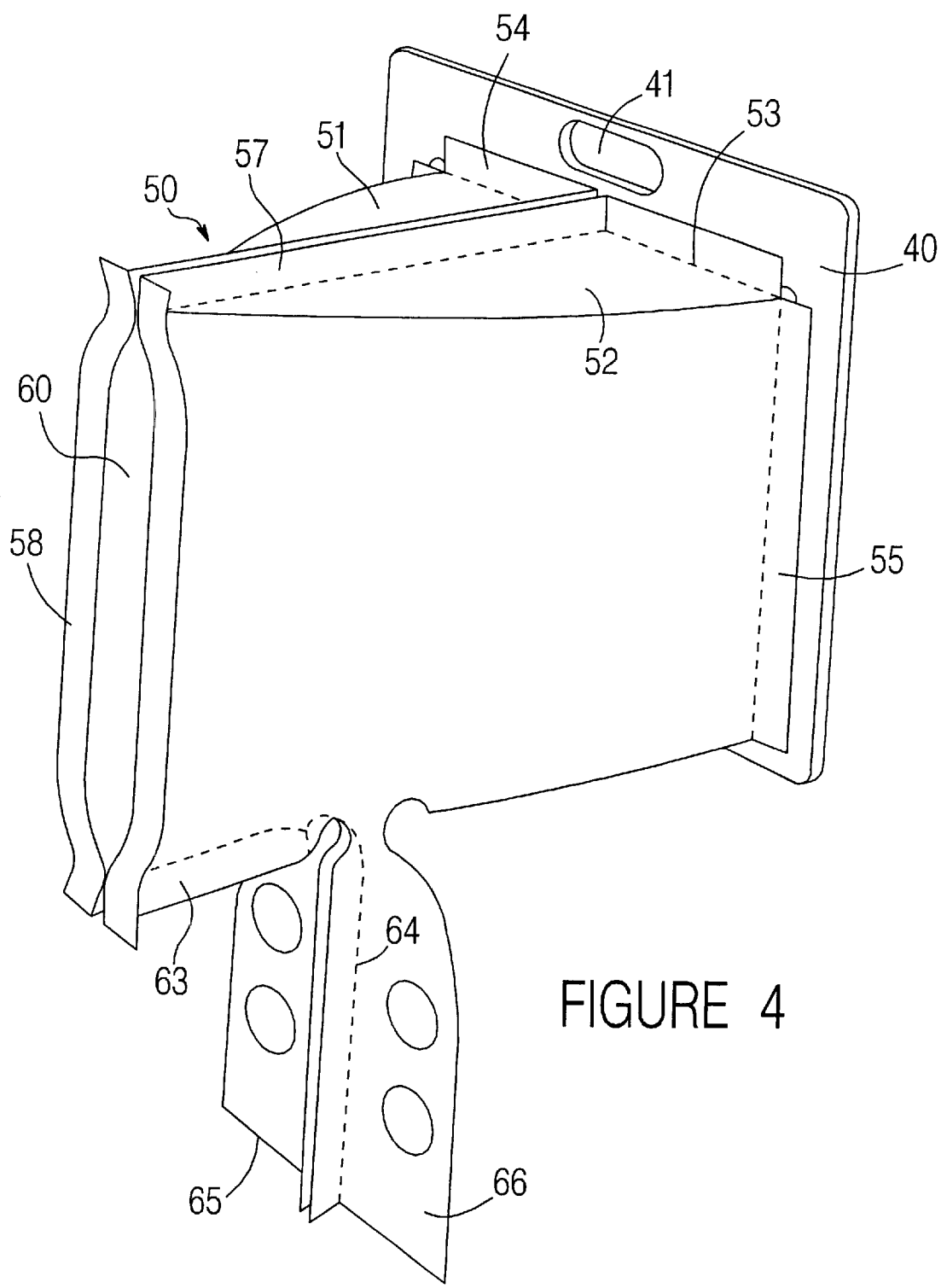
FIG. 4 is a front perspective view of the closure plate and trim tunnel used with the cavity and channel system shown in earlier FIGURES.

The tunnel components of the present invention are illustrated in FIG. 4, where plate 40 and opening 41 are again shown. Attached to the face of plate 40 opposite that shown in FIG. 3 is a liner or tunnel structure 50 prepared in the illustrated embodiment from two tunnel halves 51 and 52 joined to each other by stitching illustrated generally at 53. Flanges, such as 54 and 55, are provided around the periphery of the tunnel 50 where it is attached to plate 40 and at 57 where the two halves 51 and 52 of the tunnel are joined to each other. At the forward portion of tunnel 50, a pair of flaps 58 are illustrated. These are attached to the forward portion of the seat back trim components in any suitable way to provide the desired aesthetics, while providing an opening 60 to allow access by the user to the portion 38 of the isofix rod 37.

FIG. 4 also illustrates a bottom set of flaps 65 and 66 which are sewn to each other by stitching 64. These are attached to seat frame or padding elements to insure that the bottom of the tunnel remains open to facilitate insertion of rod 37.

To construct the isofix closeout system of the present invention, the seat back is prepared as illustrated in FIG. 1 and the wires 20 and 30 are located in a position to provide a connection between the closeout plate 40 and the front 16 of the seat back. The plate itself is constructed to include the tunnel to allow access to the isofix rod 37 which would extend up through the bottom of tunnel 50 and be adjacent the rear portion of channel 15. The hook connector from a child seat would be inserted through opening 60 when a car seat is being installed.

While the present invention has been described in connection with a single preferred embodiment, the invention may be variously embodied as indicated in the specification, and the invention is not to be limited to the particular illustrations, sizes, shapes or particular materials but is to be limited solely by the scope of the claims which follow.

What is claimed is:

1. A vehicle seating system including an anchorage rod for a car seat attachment hook comprising:
    a seat having a seat back, the seat back having a front and a rear;
    a cavity in the rear of the seat back;
    a channel extending from the cavity through the front of the seat back;
    an anchorage rod, a portion of which is located within the cavity and which is accessible through the channel; and
    a tunnel structure having a first and second wall forming a first opening proximate the front of the seat back and extending into the cavity, the distance between the walls proximate the first opening being less than the distance between the walls distal the first opening.

2. The seating system of claim 1, wherein the anchorage rod is coupled to the vehicle.

3. The seating system of claim 1 further including a closure plate covering at least a portion of the cavity.

4. The vehicle seating system of claim 3, wherein the tunnel structure extends from the first opening through the channel toward the plate.

5. The vehicle seating system of claim 4, wherein the tunnel structure is made from seat material and includes flaps attached to the front of the seat back.

6. The vehicle seating system of claim 5, wherein the tunnel structure includes an open bottom and the anchorage rod extends into the tunnel.

7. The vehicle seating system of claim 1, wherein the tunnel structure is configured to create the appearance of a smooth seam when the child seat attachment hook is not in use.

8. The vehicle seating system of claim 7, wherein the tunnel structure is formed from at least one of fabric, vinyl, and leather material.

9. The vehicle seating system of claim 8, wherein the tunnel structure walls extend outwardly away from one another in the cavity.

10. The vehicle seating system of claim 9, wherein the tunnel structure walls include flaps located proximate the first opening adjacent the front side of the seat back.

11. The vehicle seating system of claim 10, wherein the tunnel structure walls extend from the first opening through the channel and the cavity and end proximate a plate.

12. A vehicle seating system including an anchorage rod for a car seat attachment hook comprising:
   a seat having a seat back, the seat back having a front and a rear;
   a cavity in the rear of the seat back;
   a channel extending from the cavity through the front of the seat back;
   an anchorage rod, a portion of which is located within the cavity and which is accessible through the channel;
   a closure plate covering at least a portion of the cavity;
   wherein the cavity has a rear opening through the rear of the seat back, and the plate covers the rear opening; wherein the plate includes couplers holding the plate to the seat back; and wherein the plate includes a pair of spaced apart holes, the rear of the seat back includes spaced apart wires and the couplers include rings encircling the wires and passing through the openings.

13. The vehicle seating system of claim 12, further including a tunnel structure configured to create the appearance of a smooth seam when the child seat attachment hook is not in use.

14. The vehicle seating system of claim 12, wherein the tunnel structure includes two walls, wherein the distance between the walls proximate the front of the seat back is less than the distance between the walls distal the front of the seat back.

15. A vehicle seating system of the type in which a child seat anchorage bar is accessed through an opening in a seat back comprising:
   a seat including a seat back, the seat back including a front and a rear;
   a cavity formed in the rear of the seat and defined by a cavity wall and a rear facing cavity opening;
   a channel extending through the cavity wall and the front of the seat back and including a channel wall and front and back open ends;
   a liner for at least the channel, the liner extending along the channel wall and outside the front open end; and
   the portion of the liner extending outside the front open end being attached to the front of the seat back;
   wherein the cavity is at least partially covered by a plate having a front face and a rear face; and
   wherein the plate includes a pair of spaced apart holes, the rear of the seat back includes spaced apart wires and rings encircle the wires and pass through the openings.

16. The vehicle seating system of claim 15, wherein the liner is configured to create the appearance of a smooth seam when a child seat anchorage bar is not accessed through the opening.

17. The vehicle seating system of claim 15, wherein the liner includes two walls, wherein the distance between the liner walls proximate the first open end is less than the distance between the liner walls in the cavity.

* * * * *